United States Patent [19]

Otake et al.

[11] 4,414,133
[45] Nov. 8, 1983

[54] CATALYTIC COMPOSITION

[75] Inventors: Masayuki Otake; Masakatsu Hatano, both of Yokohama; Toru Koyama, Machida; Masayoshi Murayama, Yokohama; Kazunori Oshima, Tokyo, all of Japan

[73] Assignee: Mitsubishi Chemical Industries Limited, Tokyo, Japan

[21] Appl. No.: 342,238

[22] Filed: Jan. 25, 1982

[30] Foreign Application Priority Data

Feb. 5, 1981 [JP] Japan .................. 56-16196

[51] Int. Cl.$^3$ .............. B01J 27/14; B01J 29/16; B01J 29/00; B01J 29/10
[52] U.S. Cl. .................. 502/179; 502/208; 502/210; 502/214; 502/240; 502/242; 502/304
[58] Field of Search ............ 252/435, 437, 456, 457, 252/458, 459, 462, 464, 443

[56] References Cited

U.S. PATENT DOCUMENTS

| | | | |
|---|---|---|---|
| 4,035,418 | 7/1977 | Okada et al. | 252/443 X |
| 4,113,770 | 9/1978 | Okiyama et al. | 252/435 X |
| 4,155,938 | 5/1979 | Yamamoto et al. | 252/462 X |
| 4,259,211 | 3/1981 | Krabetz et al. | 252/462 X |
| 4,280,928 | 7/1981 | Kirch et al. | 252/435 X |
| 4,290,922 | 9/1981 | Amemura et al. | 252/459 X |
| 4,341,659 | 7/1982 | Kogeyama et al. | 252/456 X |

FOREIGN PATENT DOCUMENTS 2626 12/1978 European Pat. Off. .
564 7/1979 European Pat. Off. .
1497589 1/1978 United Kingdom .

Primary Examiner—Delbert E. Gantz
Assistant Examiner—William G. Wright
Attorney, Agent, or Firm—Oblon, Fisher, Spivak, McClelland & Maier

[57] ABSTRACT

There is disclosed a catalytic composition represented by the formula:

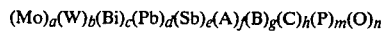

$$(Mo)_a(W)_b(Bi)_c(Pb)_d(Sb)_e(A)_f(B)_g(C)_h(P)_m(O)_n$$

in which A is iron and/or chromium, B is cerium and/or magnesium and C is potassium and/or lithium; and a, b, c, d, e, f, g, h, m and n stand for the numbers of atoms for molybdenum, tungsten, bismuth, lead, antimony, A, B, C, phosphorus and oxygen elements respectively, wherein, given that $a+b=12$, $0 \leq b \leq 7$, $0.4 \leq c \leq 7$, $2 \leq d \leq 12$, $0.1/22 \leq e/a \leq 25/22$, $0.05/22 \leq f/a \leq 3/22$, $0 \leq g/a \leq 2/22$, $0 \leq h/a \leq 3/22$, $0 \leq m/a \leq 7/22$, and n is the numbers of oxygen necessary to satisfy the valences of atoms for the individual constituent elements other than oxygen.

3 Claims, No Drawings

CATALYTIC COMPOSITION

BACKGROUND OF THE INVENTION

1. Field of the Invention

This invention relates to catalytic compositions, and more particularly to catalytic compositions which exhibit a marked catalytic effect on the formation of unsaturated nitriles by vapor-phase reaction of an olefin, ammonia and oxygen or an oxygen-containing gas, particularly on the formation of acrylonitrile by vapor-phase reaction of propylene, ammonia and oxygen or an oxygen-containing gas.

2. Description of the Prior Art

Various catalysts have heretofore been proposed for the production of acrylonitrile by vapor-phase catalytic ammoxidation of propylene. It is known in the art that a catalyst comprising molybdenum and bismuth as primary components and further containing iron, phosphorus and the like can be used industrially. Upon further study there is developed a catalyst, for example, comprising molybdenum, bismuth, iron, phosphorus and metallic elements such as nickel and cobalt. However, such a catalyst is not satisfactory in suppressing side reactions, and when such a catalyst is used under the conditions where the gaseous materials are fed into the catalyst bed at a high space velocity and where the conversion of propylene is increased, the selectivity of the catalyst is so decreased that it becomes difficult to achieve a satisfactorily good yield of acrylonitrile. Furthermore, these catalyst are not completely satisfactory with respect to catalyst life.

SUMMARY OF THE INVENTION

Upon our further study, we have found that a further improved yield of acrylonitrile can be attained by use of a catalyst comprising molybdenum, bismuth, lead, antimony, iron and/or chromium, and oxygen within a certain range of composition or a catalyst comprising further tungsten, cerium, magnesium potassium and/or lithium within a certain range of composition, and accomplished this invention.

It is an object of this invention to provide an improved catalytic composition having long life which can be used in commercial production of unsaturated nitriles including acrylonitrile to advantage.

In accordance with the present invention, the above-mentioned objective is accomplished by a catalyst composition having the formula:

$$(Mo)_a(W)_b(Bi)_c(Pb)_d(Sb)_e(A)_f(B)_g(C)_h(P)_m(O)_n$$

in which A is iron and/or chromium, B is cerium and/or magnesium and C is potassium and/or lithium; and a, b, c, d, e, f, g, h, m and n stand for the numbers of atoms for molybdenum, tungsten, bismuth, lead, antimony, A, B, C, phosphorus and oxygen elements respectively, wherein, given that $a+b=12$, $0 \leq b \leq 7$, $0.4 \leq c \leq 7$, $2 \leq d \leq 12$, $0.1/22 \leq e/a \leq 25/22$, $0.05/22 \leq f/a \leq 3/22$, $0 \leq g/a \leq 2/22$, $0 \leq h/a \leq 3/22$, $0 \leq m/a \leq 7/22$, and n is the numbers of oxygen necessary to satisfy the valences of atoms for the individual constituent elements other than oxygen.

DESCRIPTION OF THE PREFERRED EMBODIMENT

As mentioned above, the catalytic compositions of this invention are represented by the formula:

$$(Mo)_a(W)_b(Bi)_c(Pb)_d(Sb)_e(A)_f(B)_g(C)_h(P)_m(O)_n$$

in which A is iron and/or chromium, B is cerium and/or magnesium and C is potassium and/or lithium; and a, b, c, d, e, f, g, h, m, n stand for the numbers of atoms for molybdenum, tungsten, bismuth, lead, antimony, A, B, C, phosphorus and oxygen elements respectively, wherein, given that $a+b=12$, $0 \leq b \leq 7$, $0.4 \leq c \leq 7$, $2 \leq d \leq 12$, $0.1/22 \leq e/a \leq 25/22$, $0.05/22 \leq f/a \leq 3/22$, $0 \leq g/a \leq 2/22$, $0 \leq h/a \leq 3/22$, $0 \leq m/a \leq 7/22$, and n is the numbers of oxygen necessary to satisfy the valences of atoms for the individual constituent elements other than oxygen.

In these formulae, it is preferred in order to improve the selectivity of the catalyst toward the desired unsaturated nitriles that the numbers of atoms for the individual constituent elements (i.e., values, a to h and m) satisfy the following equations: given that $a+b=12$, $0 \leq b \leq 5.5$, $0.6 \leq c \leq 6$, $2.6 \leq d \leq 11$, $1/22 \leq e/a \leq 10/22$, $0.05/22 \leq f/a \leq 2/22$, $0 \leq g/a \leq 1/22$, $0 \leq h/a \leq 2/22$ $0 \leq m/a \leq 2/22$ Preferable combinations of the atoms of the catalytic composition are as follows:

Mo-W-Bi-Pb-Sb-Fe-O

Mo-W-Bi-Pb-Sb-Fe-Cr-O

Mo-W-Bi-Pb-Sb-Fe-Mg-O

Mo-W-Bi-Pb-Sb-Fe-P-O

Mo-W-Bi-Pb-Sb-Fe-Li,K-P-O

MO-W-Bi-Pb-Sb-Fe-Mg-Li,K-O

Mo-W-Bi-Pb-Sb-Fe-Ce-O

Mo-W-Bi-Pb-Sb-Fe-Ce-P-O

Mo-W-Bi-Pb-Sb-Fe-Ce-Li,K-P-O

Mo-W-Bi-Pb-Sb-Fe-Fe-Cr-Mg-O

MO-W-Bi-Pb-Sb-Fe-Cr-Mg-Li,K-O

Mo-W-Bi-Pb-Sb-Fe-Cr-Mg-Li,K-P-O

Mo-W-Bi-Pb-Sb-Fe-Cr-Ce-O

Mo-W-Bi-Pb-Sb-Fe-Cr-Ce-Li,K-O

Mo-W-Bi-Pb-Sb-Fe-Cr-Ce-Li,K-P-O

Mo-W-Bi-Pb-Sb-Fe-Cr-Li,K-O

Mo-W-Bi-Pb-Sb-Fe-Cr-Li,K-P-O

Mo-W-Bi-Pb-Sb-Fe-Mg-P-O

Mo-W-Bi-Pb-Sb-Fe-Mg-Li,K-P-O

The catalytic composition of this invention may be shaped with or without a carrier material such as silica, titania, alumina, silicon carbide or the like. The size and geometry of the shaped catalyst are not critical and the catalytic composition may be shaped into catalyst particles of any size and geometry (e.g., pellets, tablets, granules, etc.) depending on the conditions under which it is used.

Molybdenum compounds useful for the preparation of the catalytic composition of this invention include molybdenum oxides such as molybdenum trioxide, molybdic acid and its salts, and phosphomolybdic acid and its salts. Preferably molybdates such as ammonium paramolybdate are used. Useful tungsten compounds include tungsten oxides such as tungsten trioxide, tungstic acid and condensed tungstic acid and their salts such as ammonium paratungstate, and phosphotungstic acid and its salts, Bismuth compounds that can be used include bismuth salts such as bismuth nitrate and bismuth sulfate and various oxides and hydroxides of bismuth. Useful lead compounds include lead salts such as lead nitrate and lead sulfate and various oxides and hydroxides of lead. useful antimony compounds include oxides such as antimony trioxide, chlorides such as antimony trichloride and metallic antimony. Useful iron compounds include iron salts such as iron nitrate and iron sulfate and various oxides and hydroxides of iron. Useful chromium compounds include chromium salts such as chromium nitrate, chromium sulfate and ammonium dichromate and various oxides and hydroxides of chromium. Useful cerium compounds include cerium salts such as cerium nitrate and cerium sulfate and various oxides and hydroxides of cerium. Useful magnesium compounds include magnesium salts such as magnesium nitrate and magnesium chloride and various oxides and hydroxides of magnesium.

Lithium and potassium compounds that can be used include carbonates such as lithium carbonate and potassium carbonate and nitrates such as lithium nitrate and potassium nitrate and hydroxides such as lithium hydroxide and potassium hydroxide. Useful phosphorus compounds include phosphoric acids such as orthophosphoric acid and metaphosphoric acid and phosphates such as ammonium phosphate, and oxides such as phosphorus pentaoxide and phosphorus chloride oxide and heteropolyphosphoric acids such as phosphomolybdic acid and phosphotungstic acid, salts of these acids, and organophosphorus compounds.

The catalytic composition can be prepared from the appropriate combination of these raw materials by dissolving or suspending the compounds of the constituent elements in water to form a uniform aqueous slurry or solution. In some cases, a sol of a carrier material such as silica sol or alumina sol or carrier particles such as titania powder may be suspended in the slurry or solution. The resulting uniform slurry or solution is then evaporated to dryness and shaped in separate steps or in a single step by spray drying and finally calcined in a stream of air to prepare a catalyst. When shaping is made by spray drying, the catalyst having improved impact strength can be obtained by controlling the pH of the material slurry between 1 and 6 before spray drying. In preparation of the catalyst, when ammonium paramolybdate and/or ammonium paratungstate is used as the molybdenum and/or tungsten source, respectively, a dissolution accelerator such as ammonia is preferably added to the aqueous medium in order to increase the solubility of these compounds. In the case where bismuth nitrate or bismuth sulfate is employed as the bismuth source, it is preferably dissolved in a water acidified with nitric acid or sulfuric acid correspondingly. When antimony trioxide is used as the antimony source, it may be added after it has been dissolved in an aqueous solution of an organic acid such as tartaric acid, or otherwise it may be added directly in the form of powdered antimony trioxide. In the latter case, the resulting final slurry containing all the catalytic components including the antimony trioxide powder can be uniformly stirred, adjusted to pH 7 or less and heated at 40° C. or higher for 1 to 8 hours to further improve the selectivity of the finally obtained catalytic composition toward unsaturated nitriles. In this case, iron compounds may be added after heating if desired. Following the shaping step, the shaped particles are usually calcined for 5 minutes to 5 hours at a temperature in the range of 400° to 800° C., preferably in the range of 500° to 750° C., although the temperature and duration of the calcination step are not critical.

The catalytic compositions of this invention can be used in the following way. The following description is limited to the production of acrylonitrile, it is to be understood that the catalytic compositions can be used for the production of other unsaturated nitriles as well. In order to produce acrylonitrile, propylene, ammonia and oxygen or an oxygen-containing gas are contacted in the vapor phase in the presence of a catalyst according to this invention (e.g., one prepared in any of the following Examples). It is not always necessary that the starting propylene gas is of high purity, and the propylene gas may contain a substantial amount of other gas which is substantially inert to the reaction, for example, a saturated hydrocarbon such as propane. The oxygen used may be either pure oxygen gas or diluted with other gas or gases inert to the reaction. In a commercial operation air is usually employed as the oxygen-containing gas. The molar ratio of oxygen to propylene fed to the reaction zone are usually in the range of 0.8:1 to 4:1. Ammonia is fed in an amount of 0.8 to 2.5 moles, preferably 0.9 to 1.5 moles per mole of propylene. The vapor-phase reaction is usually conducted at atmospheric pressure, but it may be carried out at a subatmospheric or superatmospheric pressure as required. The reaction temperature is usually from 360° to 540° C., preferably from 400° to 500° C. The space velocity at which the gaseous reactants are fed may suitably be selected from the range of 100 to 3,000 $hr^{-1}$, preferably 200 to 2,000 $hr^{-1}$.

The catalytic compositions of this invention may be used either in the fixed or fluidized bed system.

As previously mentioned, the catalytic compositions of this invention are capable of formation of acrylonitrile with high selectivity even at an increased conversion of the starting gaseous material and hence they can be employed in the commercial production of acrylonitrile to advantage.

Having generally described the invention, a more complete understanding can be obtained by reference to certain examples which are provided herein for purposes of illustration only and are not intended to be limiting in any manner.

The terms "conversion", "selectivity" and "yield of acrylonitrile" used herein, particularly in the examples are defined by the following equations:

$$\% \text{ Conversion} = \frac{\text{Moles of propylene consumed}}{\text{Moles of propylene fed}} \times 100$$

$$\% \text{ Selectivity} = \frac{\text{Moles of acrylonitrile formed}}{\text{Moles of propylene consumed}} \times 100$$

Yield of acrylonitrile = [% Conversion] × [% selectivity]/100

EXAMPLE 1

To a solution of 0.0392 g of ammonium paratungstate [$(NH_4)_{10}W_{12}O_{41} \cdot 5H_2O$] in 2 ml of aqueous 1 wt. % ammonia was added with stirring 15.54 g of 20 wt. % silica sol, and the following solutions were added with stirring in that order: a solution of 3.030 g of lead nitrate in 5.9 ml of water; a solution of 2.225 g of ammonium paramolybdate [$(NH_4)_6Mo_7O_{24} \cdot 4H_2O$] in 11.5 ml of aqueous 5 wt. % ammonia; a solution of 1.164 g of bismuth nitrate in 1.8 ml of aqueous 10 wt. % nitric acid; one tenth of a solution of 2.08 g of commercially available antimony trioxide powder dissolved under heating in a mixture of 8.6 ml of water, 1.7 ml of aqueous 25 wt. % ammonia and 3.2 g of tartaric acid; and a solution of 0.0242 g of iron (III) nitrate [$Fe(NO_3)_3 \cdot 9H_2O$] in 0.5 ml of water. An aqueous 10 wt. % nitric acid solution was then added to the resulting slurry to adjust the pH of the slurry to 2.2, and then heated with stirring on a hot plate until the evolution of $NO_2$ ceased, and the heating was continued until the slurry was evaporated to dryness. The solid residue was compressed into tablets of 6 mm in diameter and 3 mm in thickness, which were calcined at 700° C. for 2 hours in a stream of air and then crushed to give a catalyst in the form of granules of 16 to 24 mesh (Tyler) in size. The catalyst thus obtained had the composition: $Mo_{11.86}W_{0.14}Bi_{2.26}Pb_{8.61}Sb_{1.35}Fe_{0.056}O_{50.11}$ which was supported on a carrier comprising silica. The weight ratio of silica to total catalytic components was 40:60.

A pyrex reactor of 4 mm inner diameter was packed with 0.5 ml of the supported catalyst was prepared above. A mixed gas of propylene, ammonia and air having a molar ratio of propylene to ammonia to air of 1:1.2:10 was passed at a space velocity of 1,000 hr$^{-1}$ through the catalyst bed in tubular reactor held at 470° C. to produce acrylonitrile. The reaction was carried out for 1.5 hours. The results were 94.4% conversion of propylene and 88.0% selectivity toward acrylonitrile (with 83.0% yield of acrylonitrile).

EXAMPLES 2–6

Following the procedure described in Example 1, various catalysts of composition indicated in Table 1 were prepared and used in the ammoxidation of propylene at temperatures indicated in Table 1. The results are also reported in Table 1.

EXAMPLE 7

To a suspension of 0.5247 g of commercially available antimony trioxide powder in 13 ml of water was added a solution of 0.0392 g of ammonium paratungstate [$(NH_4)_{10}W_{12}O_{41} \cdot 5H_2O$] in 2 ml of aqueous 1 wt. % ammonia, followed by 16.79 g of 20 wt. % silica sol with stirring. Thereafter the following solutions were added successively with stirring: a solution of 3.030 g of lead nitrate in 5.9 ml of water; a solution of 2.225 g of ammonium paramolybdate [$(NH_4)_6Mo_7O_{24} \cdot 4H_2O$] in 11.5 ml of aqueous 5 wt. % ammonia; a solution of 1.164 g of bismuth nitrate in 1.8 ml of aqueous 10 wt. % nitric acid; and a solution of 0.3232 g of iron (III) nitrate [$Fe(NO_3)_3 \cdot 9H_2O$] in 6 ml of water. The resulting slurry was adjusted to pH 2.2 with an aqueous 10 wt. % nitric acid solution, and then heated with stirring on a hot plate until the evolution of $NO_2$ ceased, whereupon it was evaporated to dryness. The solid residue was compressed into tablets of 6 mm in diameter and 3 mm in thickness, which were calcined at 650° C. for 2 hours in a stream of air and then crushed to give a catalyst in the form of granules of 16 to 24 mesh (Tyler).

Using 1 ml of the catalyst, the ammoxidation of propylene was carried out using the same reactor as in Example 1 and using a mixed gas of the same composition in Example 1, which was passed at a space velocity of 500 hr$^{-1}$. The reaction was carried out for 1.5 hours. The composition of the catalyst and the results of the ammoxidation reaction are shown in Table 2.

EXAMPLE 8

The procedure of Example 7 was repeated except that the catalyst was prepared from a slurry which further contained 0.0132 g of aqueous 85 wt. % orthophosphoric acid. The composition of the catalyst and the results of the reaction are shown in Table 2.

EXAMPLE 9

To a suspension of 0.3498 g of commercially available antimony trioxide powder in 8.7 ml of water was added a solution of 0.0392 g of ammonium paratungstate [$(NH_4)_{10}W_{12}O_{41} \cdot 5H_2O$] in 2 ml of aqueous 1 wt. % ammonia, followed by 16.21 g of 20 wt. % silica sol with stirring. Thereafter the following solutions were added successively with stirring: a solution of 3.030 g of lead nitrate in 5.9 ml of water; a solution of 2.225 g of ammonium paramolybdate [$(NH_4)_6Mo_7O_{24} \cdot 4H_2O$] in 11.5 ml of aqueous 5 wt. % ammonia; and a solution of 1.164 g of bismuth nitrate in 1.8 ml of aqueous 10 wt. % nitric acid. The resulting slurry was adjusted to pH 2.8 with an aqueous 10 wt. % nitric acid solution, and was placed in a three-necked flask and heated under reflux for 3 hours at 100° C. During this heating, the pH of the slurry rose from 2.8 to 3.6 and it was readjusted to 2.2. To this slurry a solution of 0.03232 g of iron (III) nitrate [$Fe(NO_3)_3 \cdot 9H_2O$] in 6 ml of water was added and the pH of the slurry was readjusted to 2.2, and then heated with stirring on a hot plate until the evolution of $NO_2$ ceased, whereupon it was evaporated to dryness. The solid residue was compressed into tablets of 6 mm in diameter and 3 mm in thickness, which were calcined at 700° C. for 2 hours in a stream of air and then crushed to give a catalyst in the form of granules of 16 to 24 mesh (Tyler).

Using 1 ml of the catalyst, the ammoxidation of propylene was carried out under the same conditions as in Example 8. The composition of the catalyst and the results of the ammoxidation reaction are shown in Table 2.

EXAMPLES 10-12

The procedure of Example 9 was repeated except that the heating of the slurry under reflux at 100° C. was omitted. The composition of the catalyst and the results of the ammoxidation reaction are shown in Table 2.

EXAMPLE 13

The procedure of Example 12 was repeated except that the catalyst was prepared from a slurry which further contained a solution of the precipitate of potassium phosphotungstate ($P_2O_5.24WO_3.42H_2O$). This solution was obtained by adding a solution of 6.9 mg of potassium carbonate ($K_2CO_3$) in 0.3 ml of water to a solution of 107.7 mg of commercially available phosphotungstic acid ($P_2O_5.24WO_3.42H_2O$) in 5 ml of water.

The composition of the catalyst and the results of the reaction are shown in Table 2.

COMPARATIVE EXAMPLE 1

The procedure of Example 1 was repeated except that iron (III) nitrate [$Fe(NO_3)_3.9H_2O$] was not used. The composition of the catalyst and the results of the reaction are shown in Table 1.

COMPARATIVE EXAMPLE 2

The procedure of Example 1 was repeated except that antimony trioxide was not used. The composition of the catalyst and the results of the reaction are shown in Table 1.

EXAMPLE 14

To a solution of 0.0392 g of ammonium paratungstate [$(NH_4)_{10}W_{12}O_{41}.5H_2O$] in 2 ml of aqueous 1 wt. % ammonia was added with stirring 16.14 g of 20 wt. % silica sol, and the following solutions were added with stirring in that order: a solution of 3.030 g of lead nitrate in 5.9 ml of water; a solution of 2.225 g of ammonium paramolybdate [$(NH_4)_6Mo_7O_{24}.4H_2O$] in 11.5 ml of aqueous 5 wt. % ammonia; a solution of 1.164 g of bismuth nitrate in 1.8 ml of aqueous 10 wt. % nitric acid; one tenth of a solution of 3.43 g of commercially available antimony trioxide powder dissolved under heating in a mixture of 14.2 ml of water, 2.80 ml of aqueous 25 wt. % ammonia and 5.3 g of tartaric acid; a solution of 0.115 g of iron (III) nitrate [$Fe(NO_3)_3.9H_2O$] in 3 ml of water; and a solution of 0.138 g of chromium nitrate [$Cr(NO_3)_3.9H_2O$] in 3 ml of water. An aqueous 10 wt. % nitric acid solution was then added to the resulting slurry to adjust the pH of the slurry to 2.2, and then heated with stirring on a hot plate until the evolution of $NO_2$ ceased, and the heating was continued until the slurry was evaporated to dryness. The solid residue was compressed into tablets of 6 mm in diameter and 3 mm in thickness, which were calcined at 700° C. for 2 hours in a stream of air and then crushed to give a catalyst in the form of granules of 16 to 24 mesh (Tyler) in size. The catalyst thus obtained had the composition: $Mo_{11.86}W_{0.14}Bi_{2.26}Pb_{8.61}Sb_{2.21}Fe_{0.27}Cr_{0.32}O_{52.20}$ which was supported on a carrier comprising silica. The weight ratio of silica to total catalytic components was 40:60.

A pyrex reactor of 4 mm inner diameter was packed with 1 ml of supported catalyst as prepared above. A mixed gas of propylene, ammonia and air having a molar ratio of propylene to ammonia to air of 1:1.2:10 was passed at a space velocity of 500 hr$^{-1}$ through the catalyst bed in tubular reactor held at 460° C. to produce acrylonitrile. The reaction was carried out for 1.5 hours. The results were 98.6% conversion of propylene and 86.2% selectivity toward acrylonitrile (with 85.0% yield of acrylonitrile).

EXAMPLES 15-19

Following the procedure described in Example 14, various catalysts of composition indicated in Table 3 were prepared and used in the ammoxidation of propylene at temperatures indicated in Table 3. The results are also reported in Table 3.

COMPARATIVE EXAMPLE 3

The procedure of Example 14 was repeated except that iron (III) nitrate [$Fe(NO_3)_3.9H_2O$] was not used and the amount of chromium nitrate [$Cr(NO_3)_3.9H_2O$] was increased. The composition of the catalyst and the results of the reaction are shown in Table 3.

COMPARATIVE EXAMPLE 4

The procedure of Example 16 was repeated except that antimony trioxide was not used.

The composition of the catalyst and the results of the reaction are shown in Table 3.

EXAMPLE 20

The procedure of Example 14 was repeated except that iron (III) nitrate [$Fe(NO_3)_3.9H_2O$] was not used and the amount of chromium nitrate [$Cr(NO_3)_3.9H_2O$] was increased. The composition of the catalyst and the results of the reacton are shown in Table 3.

TABLE 1

| Ex. No. | Composition of Catalyst (Atomic Ratio) | | | | | | | Reaction Temp. (°C.) | % Conversion of Propylene | % Selectivity toward AN* | % Yield of AN* |
|---|---|---|---|---|---|---|---|---|---|---|---|
| | Mo | W | Bi | Pb | Sb | Fe | O | | | | |
| 1 | 11.86 | 0.14 | 2.26 | 8.61 | 1.35 | 0.056 | 50.11 | 470 | 94.4 | 88.0 | 83.1 |
| 2 | 11.86 | 0.14 | 2.26 | 8.61 | 1.46 | 0.11 | 50.36 | 470 | 95.0 | 87.5 | 83.1 |
| 3 | 11.86 | 0.14 | 2.26 | 8.61 | 1.73 | 0.27 | 51.00 | 470 | 95.0 | 87.0 | 82.7 |
| 4 | 11.86 | 0.14 | 2.26 | 8.61 | 1.91 | 0.43 | 51.51 | 470 | 95.1 | 87.1 | 82.8 |
| 5 | 11.86 | 0.14 | 2.26 | 8.61 | 2.10 | 0.59 | 52.04 | 470 | 96.3 | 86.0 | 82.8 |
| 6 | 11.86 | 0.14 | 2.26 | 8.61 | 1.73 | 0.43 | 51.24 | 470 | 97.5 | 86.2 | 84.0 |
| Comp. Ex. 1 | 11.86 | 0.14 | 2.26 | 8.61 | 1.08 | | 49.62 | 470 | 91.4 | 88.0 | 80.4 |
| Comp. Ex. 2 | 11.86 | 0.14 | 2.26 | 8.61 | | 0.05 | 48.08 | 470 | 95.7 | 79.8 | 76.4 |

*AN = Acrylonitrile
(Reaction Time: 1.5 hours)

TABLE 2

| Ex. No. | Composition of Catalyst (Atomic Ratio) | | | | | | | | | Reaction Temp. (°C.) | % Conversion of Propylene | % Selectivity toward AN* | % Yield of AN* |
|---|---|---|---|---|---|---|---|---|---|---|---|---|---|
| | Mo | W | Bi | Pb | Sb | Fe | P | K | O | | | | |
| 7 | 11.86 | 0.14 | 2.26 | 8.61 | 3.40 | 0.75 | | | 54.23 | 450 | 98.5 | 85.1 | 83.8 |
| 8 | 11.86 | 0.14 | 2.26 | 8.61 | 3.40 | 0.75 | 0.11 | | 54.50 | 460 | 98.4 | 86.2 | 84.8 |
| 9 | 11.86 | 0.14 | 2.26 | 8.61 | 2.26 | 0.75 | | | 52.52 | 460 | 98.6 | 85.6 | 84.4 |
| 10 | 11.86 | 0.14 | 2.26 | 8.61 | 2.26 | 0.75 | | | 52.52 | 460 | 99.1 | 84.6 | 83.8 |
| 11 | 11.78 | 0.22 | 3.49 | 6.76 | 1.71 | 0.16 | | | 50.80 | 460 | 99.1 | 86.0 | 85.2 |
| 12 | 11.86 | 0.14 | 2.26 | 8.61 | 1.88 | 0.75 | | | 51.95 | 460 | 99.5 | 83.4 | 83.0 |
| 13 | 11.49 | 0.51 | 2.19 | 8.34 | 1.83 | 0.73 | 0.03 | 0.09 | 51.59 | 460 | 99.1 | 84.6 | 83.8 |

*AN = Acrylonitrile
(Reaction Time: 1.5 hours)

TABLE 3

| Ex. No. | Composition of Catalyst (Atomic Ratio) | | | | | | | | Reaction Temp. (°C.) | % Conversion of Propylene | % Selectivity toward AN* | % Yield of AN* |
|---|---|---|---|---|---|---|---|---|---|---|---|---|
| | Mo | W | Bi | Pb | Sb | Fe | Cr | O | | | | |
| 14 | 11.86 | 0.14 | 2.26 | 8.61 | 2.21 | 0.27 | 0.32 | 52.50 | 460 | 98.6 | 86.2 | 85.0 |
| 15 | 11.86 | 0.14 | 2.26 | 8.61 | 1.94 | 0.27 | 0.16 | 51.56 | 460 | 98.9 | 85.8 | 84.9 |
| 16 | 11.86 | 0.14 | 2.26 | 8.61 | 2.32 | 0.38 | 0.22 | 52.38 | 460 | 98.5 | 86.0 | 84.7 |
| 17 | 11.86 | 0.14 | 2.26 | 8.61 | 2.21 | 0.43 | 0.16 | 52.20 | 450 | 97.5 | 86.5 | 84.3 |
| 18 | 11.85 | 0.15 | 1.67 | 9.53 | 2.26 | 0.30 | 0.36 | 52.42 | 460 | 98.7 | 85.6 | 84.5 |
| 19 | 11.87 | 0.13 | 2.76 | 7.88 | 2.00 | 0.25 | 0.30 | 51.85 | 460 | 98.6 | 85.7 | 84.5 |
| 20 | 11.86 | 0.14 | 2.26 | 8.61 | 2.21 | | 0.59 | 52.20 | 460 | 99.5 | 84.4 | 84.0 |
| Comp. Ex. 3 | 11.86 | 0.14 | 2.26 | 8.61 | 2.21 | | 2.70 | 55.37 | 470 | 99.5 | 75.9 | 75.5 |
| Comp. Ex. 4 | 11.86 | 0.14 | 2.26 | 8.61 | | 0.38 | 0.22 | 48.9 | 470 | 100 | 74.3 | 74.3 |

*AN = Acrylonitrile
(Reaction Time: 1.5 hours)

EXAMPLE 21

Using 1 ml of the same catalyst of Example 3, the ammoxidation of propylene was carried out at 460° C. using the same reactor as in Example 1 and using a mixed gas of the same composition in Example 1, which was passed at a space velocity of 500 hr$^{-1}$.

The results of the reaction after 1.5 hours are shown in Table 4. The continuous reaction was carried out for further 15 hours, and the selectivity toward acrylonitrile was increased to a fixed value shown in Table 4.

EXAMPLE 22

The procedure of Example 21 was repeated except that a mixed gas of propylene, ammonia and air having a molar ratio of propylene to ammonia to air of 1:1.1:10 was used.

The results obtained after the reaction was carried out for 16.5 hours are shown in Table 4.

EXAMPLES 23 AND 24

The procedures of Examples 21 and 22 were repeated using the same catalyst of Example 5. The results are summarized in Table 4.

EXAMPLE 25

The procedure of Example 22 was repeated except that the catalyst was prepared as in Example 3 from a slurry which further contained 1 ml of aqueous cerium nitrate [Ce(NO$_3$)$_3$.6H$_2$O] solution contaning 0.1 atom cerium per liter.

The composition of the catalyst and the results of the reaction are shown in Table 5.

EXAMPLE 26

The procedure of Example 25 was repeated except that the catalyst was prepared from a slurry which further contained 1. ml of aqueous potassium carbonate (K$_2$CO$_3$) solution containing 0.1 atom potassium per liter.

The composition of the catalyst and the results of the reaction are shown in Table 5.

EXAMPLE 27

The procedure of Example 26 was repeated except that the catalyst was prepared from a slurry which further contained 0.0132 g of aqueous 85 wt. % orthophosphoric acid. The composition of the catalyst and the results of the reaction are shown in Table 5.

EXAMPLE 28

The procedure of Example 24 was repeated except that the catalyst was prepared as in Example 5 from a slurry which further contained 1.1 ml of aqueous magnesium nitrate [Mg(NO$_3$)$_2$.6H$_2$O] solution containing 0.1 atom magnesium per liter.

The composition of the catalyst and the results of the reaction are shown in Table 5.

EXAMPLE 29

The procedure of Example 28 was repeated except that the catalyst was prepared from a slurry which further contained 1.7 ml of aqueous lithium nitrate (LiNO$_3$) solution containing 0.1 atom lithium per liter.

The composition of the catalyst and the results of the reaction are shown in Table 5.

EXAMPLE 30

The procedure of Example 29 was repeated except that the catalyst was prepared from a slurry which further contained 0.01 g of aqueous 85 wt. % orthophosphoric acid. The composition of the catalyst and the results of the reaction are shown in Table 5.

EXAMPLE 31

The procedure of Example 14 was repeated except that continuous reaction was carried out for 16.5 hours. The results are shown in Table 6.

EXAMPLE 32

The procedure of Example 31 was repeated except that a mixed gas of propylene, ammonia and air having a molar ratio of propylene to ammonia to air of 1:1.1:10 was used. The continuous reaction was carried out for 16.5 hours. The results are shown in Table 6.

EXAMPLE 33

The procedure of Example 32 was repeated except that the catalyst was prepared as in Example 14 from a slurry which further contained 0.55 ml of aqueous potassium carbonate ($K_2CO_3$) solution containing 0.1 atom potassium per liter. The composition of the catalyst and the results of the reaction are shown in Table 6.

EXAMPLE 34

The procedure of Example 33 was repeated except that the catalyst was prepared from a slurry which further contained 0.55 ml of aqueous orthophosphoric acid solution containing 0.1 atom phosphorus per liter. The composition of the catalyst and the results of the reaction are shown in Table 6.

EXAMPLE 35

The procedure of Example 32 was repeated except that the catalyst was prepared from a slurry which further contained 1.1 ml of aqueous magnesium nitrate [$Mg(NO_3)_2.6H_2O$] solution containing 0.1 atom magnesium per liter. The composition of the catalyst and the results of the reaction are shown in Table 6.

EXAMPLE 36

The procedure of Example 35 was repeated except that the catalyst was prepared from a slurry which further contained 1.1 ml of aqueous potassium carbonate ($K_2CO_3$) solution containing 0.1 atom potassium per liter. The composition of the catalyst and the results of the reaction are shown in Table 6.

EXAMPLE 37

The procedure of Example 36 was repeated except that the catalyst was prepared from a slurry which further contained 1.1 ml of aqueous orthophosphoric acid solution containing 0.1 atom phosphorus per liter. The composition of the catalyst and the results of the reaction are shown in Table 6.

EXAMPLE 38

The procedure of Example 32 was repeated except that the catalyst was prepared from a slurry which further contained 1 ml of aqueous cerium nitrate [$Ce(NO_3)_3.6H_2O$] solution containing 0.1 atom cerium per liter. The composition of the catalyst and the results of the reaction are shown in Table 6.

EXAMPLE 39

The procedure of Example 38 was repeated except that the catalyst was prepared from a slurry which further contained 1.1 ml of aqueous potassium carbonate ($K_2CO_3$) solution containing 0.1 atom potassium per liter. The composition of the catalyst and the results of the reaction are shown in Table 6.

EXAMPLE 40

The procedure of Example 39 was repeated except that the catalyst was prepared from a slurry which further contained 1.1 ml of aqueous orthophosphoric acid solution containing 0.1 atom phosphorus per liter.
The composition of the catalyst and the results of the reaction are shown in Table 6.

TABLE 4

| Ex. No. | Composition of Raw Material Gas (molar ratio) PPY*/NH3/Air | Reaction Time (hr) | Reaction Temp. (°C.) | % Conversion of Propylene | % Selectivity toward AN* | % Yield of AN* |
|---|---|---|---|---|---|---|
| 21 | 1/1.2/10 | 1.5 | 460 | 98.1 | 85.8 | 84.2 |
|    | 1/1.2/10 | 16.5 | 460 | 98.1 | 86.7 | 85.1 |
| 22 | 1/1.1/10 | 16.5 | 460 | 98.1 | 84.7 | 83.1 |
| 23 | 1/1.2/10 | 1.5 | 460 | 98.2 | 85.8 | 84.3 |
|    | 1/1.2/10 | 16.5 | 460 | 98.0 | 87.1 | 85.4 |
| 24 | 1/1.1/10 | 16.5 | 460 | 98.0 | 85.6 | 83.9 |

*PPY = Propylene
*AN = Acrylonitrile

TABLE 5

| Ex. No. | Composition of Catalyst (Atomic Ratio) | | | | | | | | | | | | Reaction Temp. (°C.) | % Conversion of Propylene | % Selectivity toward AN* | % Yield of AN* |
| --- | --- | --- | --- | --- | --- | --- | --- | --- | --- | --- | --- | --- | --- | --- | --- | --- |
|  | Mo | W | Bi | Pb | Sb | Fe | Ce | Mg | Li | K | P | O | | | | |
| 22 | 11.86 | 0.14 | 2.26 | 8.61 | 1.73 | 0.27 | | | | | | 51.0 | 460 | 98.1 | 84.7 | 83.1 |
| 25 | 11.86 | 0.14 | 2.26 | 8.61 | 1.73 | 0.27 | 0.09 | | | | | 51.14 | 460 | 98.2 | 85.7 | 84.2 |
| 26 | 11.86 | 0.14 | 2.26 | 8.61 | 1.73 | 0.27 | 0.09 | | | 0.11 | | 51.20 | 460 | 98.0 | 86.4 | 84.7 |
| 27 | 11.86 | 0.14 | 2.26 | 8.61 | 1.73 | 0.27 | 0.09 | | | 0.11 | 0.11 | 51.48 | 460 | 97.5 | 87.6 | 85.4 |
| 24 | 11.86 | 0.14 | 2.26 | 8.61 | 2.1 | 0.59 | | | | | | 52.04 | 460 | 98.0 | 85.6 | 83.9 |
| 28 | 11.86 | 0.14 | 2.26 | 8.61 | 2.1 | 0.59 | | 0.11 | | | | 52.15 | 460 | 99.1 | 85.8 | 85.0 |
| 29 | 11.86 | 0.14 | 2.26 | 8.61 | 2.1 | 0.59 | | 0.11 | 0.16 | | | 52.23 | 460 | 98.9 | 86.7 | 85.7 |
| 30 | 11.86 | 0.14 | 2.26 | 8.61 | 2.1 | 0.59 | | 0.11 | 0.16 | | 0.08 | 52.43 | 460 | 98.5 | 87.5 | 86.2 |

*AN = Acrylonitrile

TABLE 6

| Ex. No. | Composition of Catalyst (Atomic Ratio) | | | | | | | | | | | | Reaction Temp. (°C.) | % Conversion of Propylene | % Selectivity toward AN[2] | % Yield of AN[2] |
|---|---|---|---|---|---|---|---|---|---|---|---|---|---|---|---|---|
| | Mo | W | Bi | Pb | Sb | Fe | Cr | Ce | Mg | Li | K | P | O | | | |
| 31[1] | 11.86 | 0.14 | 2.26 | 8.61 | 2.21 | 0.27 | 0.32 | | | | | | 52.2 | 460 | 98.5 | 87.3 | 86.0 |
| 32 | 11.86 | 0.14 | 2.26 | 8.61 | 2.21 | 0.27 | 0.32 | | | | | | 52.2 | 460 | 98.5 | 86.4 | 85.1 |
| 33 | 11.86 | 0.14 | 2.26 | 8.61 | 2.21 | 0.27 | 0.32 | | | | 0.05 | | 52.23 | 460 | 98.0 | 87.2 | 85.5 |
| 34 | 11.86 | 0.14 | 2.26 | 8.61 | 2.21 | 0.27 | 0.32 | | | | 0.05 | 0.05 | 52.35 | 460 | 97.6 | 88.1 | 86.0 |
| 35 | 11.86 | 0.14 | 2.26 | 8.61 | 2.21 | 0.27 | 0.32 | | | 0.11 | | | 52.31 | 460 | 99.0 | 87.1 | 86.2 |
| 36 | 11.86 | 0.14 | 2.26 | 8.61 | 2.21 | 0.27 | 0.32 | | | 0.11 | 0.11 | | 52.37 | 460 | 98.8 | 87.7 | 86.6 |
| 37 | 11.86 | 0.14 | 2.26 | 8.61 | 2.21 | 0.27 | 0.32 | | | 0.11 | 0.11 | 0.11 | 52.64 | 460 | 98.3 | 88.6 | 87.1 |
| 38 | 11.86 | 0.14 | 2.26 | 8.61 | 2.21 | 0.27 | 0.32 | 0.05 | | | | | 52.28 | 460 | 98.5 | 87.1 | 85.8 |
| 39 | 11.86 | 0.14 | 2.26 | 8.61 | 2.21 | 0.27 | 0.32 | 0.05 | | | 0.05 | | 52.31 | 460 | 98.2 | 87.8 | 86.2 |
| 40 | 11.86 | 0.14 | 2.26 | 8.61 | 2.21 | 0.27 | 0.32 | 0.05 | | | 0.05 | 0.05 | 52.44 | 460 | 97.9 | 88.8 | 86.9 |

[1]Ex. 31 PPY/NH$_3$/Air = 1/1.2/10
Ex. 32-40 PPY/NH$_3$/Air = 1/1.1/10
[2]AN = Acrylonitrile

EXAMPLE 41

The catalyst of the same composition as in Example 3 was prepared as follows:

To a solution of 78.4 g of ammonium paratungstate [(NH$_4$)$_{10}$W$_{12}$O$_{41}$.5H$_2$O] in 1 l of aqueous 1 wt. % ammonia was added with stirring 31.08 Kg of 20 wt. % silica sol, and the following solutions were added with stirring in that order: a solution of 6.06 Kg of lead nitrate in 11.3 l of water; a solution of 4.450 Kg of ammonium paramolybdate [(NH$_4$)$_6$Mo$_7$O$_{24}$.4H$_2$O] in 8.5 l of aqueous 5 wt. % ammonia; a solution of 2.328 Kg of bismuth nitrate in 2.70 l of aqueous 10 wt. % nitric acid; a solution of 554.7 g of commercially available antimony trioxide powder dissoled under heating in a mixture of 2.3 l of water, 453 ml of aqueous 25 wt. % ammonia and 850 g of tartaric acid; and a solution of 242 g of iron (III) nitrate [Fe(NO$_3$)$_3$.9H$_2$O] in 2.75 l of water. An aqueous 67 wt. % nitric acid solution was then added to the resulting slurry to adjust the pH of the slurry to 2.2. The resulting slurry was homogenized by the homogenizer and spray dried in usual way using the spray dryer having rotating disk and calcined at 715° C. at a residence time of 14 minutes continuously using rotary calcination kiln and the catalyst of 57µ diameter was obtained. A fluidized bed reactor of 2.5 inch inner diameter was packed with 1,850 g of the supported catalyst as prepared above. A mixed gas of propylene, ammonia and air having a molar ratio of propylene to ammonia to air of 1:1.1:12.7 was passed at a 0.068 hr$^{-1}$ feed of propylene per 1 g of catalyst in the reactor held at 480° C. and 0.85 kg/cm$^2$G to produce acrylonitrile.

The variation of catalytic activity with time was investigated. The results are shown in Table 7 below.

COMPARATIVE EXAMPLE 5

To a solution of 261 g of ammonium paratungstate [(NH$_4$)$_{10}$W$_{12}$O$_{41}$.5H$_2$O] in 3.3 l of aqueous 1 wt. % ammonia was added with stirring 350 g of commercially available antimony trioxide powder and 32.6 kg of 20 wt. % silica sol, and the following solutions were added with stirring in that order: a solution of 6.29 kg of lead nitrate in 11.7 l of water; a solution of 4.450 kg of ammonium paramolybdate [(NH$_4$)$_6$Mo$_7$O$_{24}$.4H$_2$O] in 8.5 l of aqueous 5 wt. % ammonia; and a solution of 2.328 kg of bismuth nitrate in 2.7 l of aqueous 10 wt. % nitric acid. An aqueous 67 wt. % nitric acid solution was then added to the resulting slurry to adjust the pH of the slurry to 4.2. Separately a solution of 13.8 g of potassium carbonate (K$_2$CO$_3$) in 500 ml of water was added to a solution of 215.4 g of phosphotungstic acid (P$_2$O$_5$.2- 4WO$_3$.42H$_2$O) in 1 l of water. This mixture solution was added to the above slurry and the resulting slurry was placed in a three-necked flask and heated under reflux for 3 hours at 100° C. During this heating, the pH of the slurry rose from 4.2 to 5.0 and it was readjusted to 4.2.

The resulting slurry was homogenized by the homogenizer and spray dried in usual way using the spary dryer having rotating disk and calcined at 685° C. at a residence time of 14 minutes continuously using the rotary calcination filn and the catalyst of 50µ diameter was obtained. The catalyst thus obtained had the composition: Mo$_{11.2}$W$_{0.8}$Bi$_{2.1}$Pb$_{8.4}$Sb$_{1.07}$K$_{0.09}$P$_{0.03}$O$_{49.28}$ which was supported on a carrier comprising silica. The weight ratio of silica to toal catalytic components was 40:60. Using 1,850 g of the catalyst ammoxidation was carried out in the same way as in Example 41.

TABLE 7

| Run | Reaction Time (hr) | % Conversion of Propylene | % Selectivity toward AN* | % Yield of AN* |
|---|---|---|---|---|
| 1 | 20 | 98.1 | 81.0 | 79.5 |
| 2 | 100 | 97.0 | 82.0 | 79.5 |
| 3 | 150 | 96.4 | 82.5 | 79.5 |
| 4 | 200 | 96.2 | 82.6 | 79.5 |

TABLE 8

| Run | Reaction Time (hr) | % Conversion of Propylene | % Selectivity toward AN* | % Yield of AN* |
|---|---|---|---|---|
| 1 | 20 | 98.7 | 79.1 | 78.1 |
| 2 | 100 | 97.2 | 80.2 | 78.0 |
| 3 | 150 | 95.7 | 80.6 | 77.1 |
| 4 | 200 | 94.3 | 81.0 | 76.4 |

*AN = Acrylonitrile

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A catalytic composition represented by the formula:

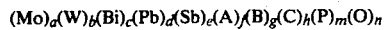

in which A is iron and/or chromium, B is cerium and/or magnesium and C is potassium and/or lithium; and a, b, c, d, e, f, g, h, m and n stand for the numbers of atoms for molybdenum, tungsten, bismuth, lead, antimony, A, B, C, phosphorus and oxygen elements respectively, wherein, given that $a+b=12$, $0 \leq b \leq 7$, $0.4 \leq c \leq 7$, $2 \leq d \leq 12$, $0.1/22 \leq e/a \leq 25/22$, $0.05/22 \leq f/a \leq 3/22$, $0 \leq g/a \leq 2/22$, $0 \leq h/a \leq 3/22$, $0 \leq m/a \leq 7/22$, and n is the numbers of oxygen necessary to satisfy the valences of atoms for the individual constituent elements other than oxygen.

2. The composition of claim 1, wherein said catalyst is supported on a carrier material selected from the group consisting of silica, titania, alumina and silicon carbide.

3. The composition of claim 1, wherein, given that $a+b=12$, the number of atoms are as follows:

$0 \leq b \leq 5.5$, $0.6 \leq c \leq 6$, $2.6 \leq d \leq 11$, $1/22 \leq e/a \leq 10/22$, $0.05/22 \leq f/a \leq 2/22$, $0 \leq g/a \leq 1/22$, $0 \leq h/a \leq 2/22$, $0 \leq m/a \leq 2/22$.

* * * * *

UNITED STATES PATENT AND TRADEMARK OFFICE
CERTIFICATE OF CORRECTION

PATENT NO.   : 4,414,133
DATED        : November 8, 1983
INVENTOR(S)  : Masayuki Otake et al It is certified that error appears in the above-identified patent and that said Letters Patent is hereby corrected as shown below:

Column 2,   line 53, change "MO" to -- Mo --;

line 61, change "Mo-W-Bi-Pb-Sb-Fe-Fe-Cr-Mg-O" to

-- Mo-W-Bi-Pb-Sb-Fe-Cr-Mg-O --;

line 63, change "MO" to -- Mo --;

Column 3,   line 28, change "," to -- . --;

line 33, change "useful" to -- Useful --;

Column 9,   line 68, change "1." to -- 1.1 --;

Column 13,  line 32, change "dissloed" to -- dissolved --;

Column 14,  line 25, change "spary" to -- spray --;

line 28, change "filn" to -- kiln --;

line 32, change "toal" to -- total --;

UNITED STATES PATENT AND TRADEMARK OFFICE
CERTIFICATE OF CORRECTION

Page 2 of 2

PATENT NO. : 4,414,133
DATED : November 8, 1983
INVENTOR(S) : Masayuki Otake et al It is certified that error appears in the above-identified patent and that said Letters Patent is hereby corrected as shown below:

Column 14, line 35, insert as a separate paragraph immediately preceding Table 7: -- The results are shown in Table 8. --.

Signed and Sealed this

Seventh Day of August 1984

[SEAL]

Attest:

GERALD J. MOSSINGHOFF

Attesting Officer

Commissioner of Patents and Trademarks